United States Patent [19]

Larsson

[11] Patent Number: 4,683,718

[45] Date of Patent: Aug. 4, 1987

[54] METHOD AND APPARATUS FOR MONITORING HYDRO TURBINE PLANTS

[75] Inventor: Hans Larsson, Kungsangen, Sweden

[73] Assignee: ITT Industries, Inc., New York, N.Y.

[21] Appl. No.: 772,294

[22] Filed: Sep. 4, 1985

[30] Foreign Application Priority Data

Sep. 5, 1984 [SE] Sweden .............................. 8404441

[51] Int. Cl.⁴ ............................................ F16D 31/00
[52] U.S. Cl. ........................................ 60/327; 60/328; 60/398; 415/24
[58] Field of Search ................... 60/327, 328, 398; 415/24, 50, 62, 143; 417/36, 46, 40, 41, 7

[56] References Cited

U.S. PATENT DOCUMENTS

| 1,529,186 | 3/1925 | Karnasch et al. | 415/24 X |
|---|---|---|---|
| 1,901,773 | 3/1933 | Pfau | 415/24 X |
| 3,060,858 | 10/1962 | Shoosmith | 417/7 X |
| 3,214,915 | 11/1965 | Weibel | 60/398 |
| 3,730,638 | 5/1973 | Kuwabara | 415/24 |
| 3,775,025 | 11/1973 | Maher, Jr. et al. | 417/7 |

FOREIGN PATENT DOCUMENTS 106183  6/1983  Japan ...................................... 415/24

Primary Examiner—Edward K. Look
Attorney, Agent, or Firm—Menotti J. Lombardi

[57] ABSTRACT

A method and a device for monitoring hydro turbine plants. The device comprises one or several hydro turbines, at least one of them having adjustable vanes. For optimum utilization of the available amount of water, the vane angles in the turbine are automatically adjustable in dependence on the level in the water dam, which level is measured at predetermined intervals. When the plant comprises several turbines, the level indicator is also used for start and stop.

6 Claims, 6 Drawing Figures

FIG. 1a
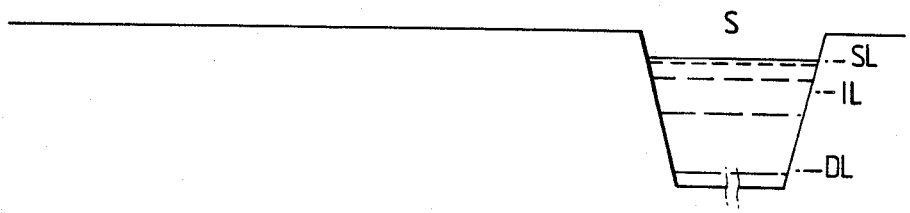
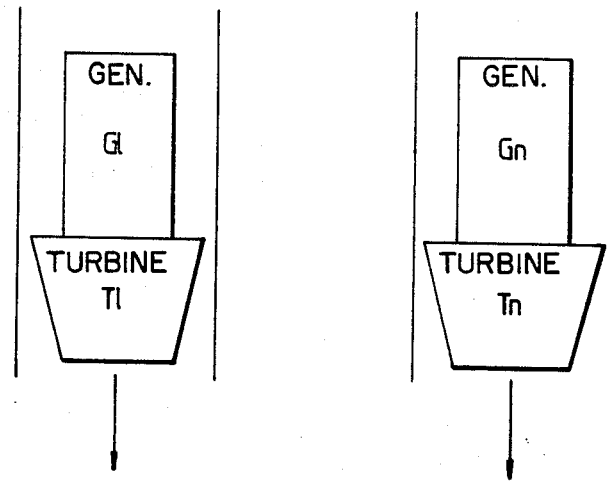
FIG. 1b

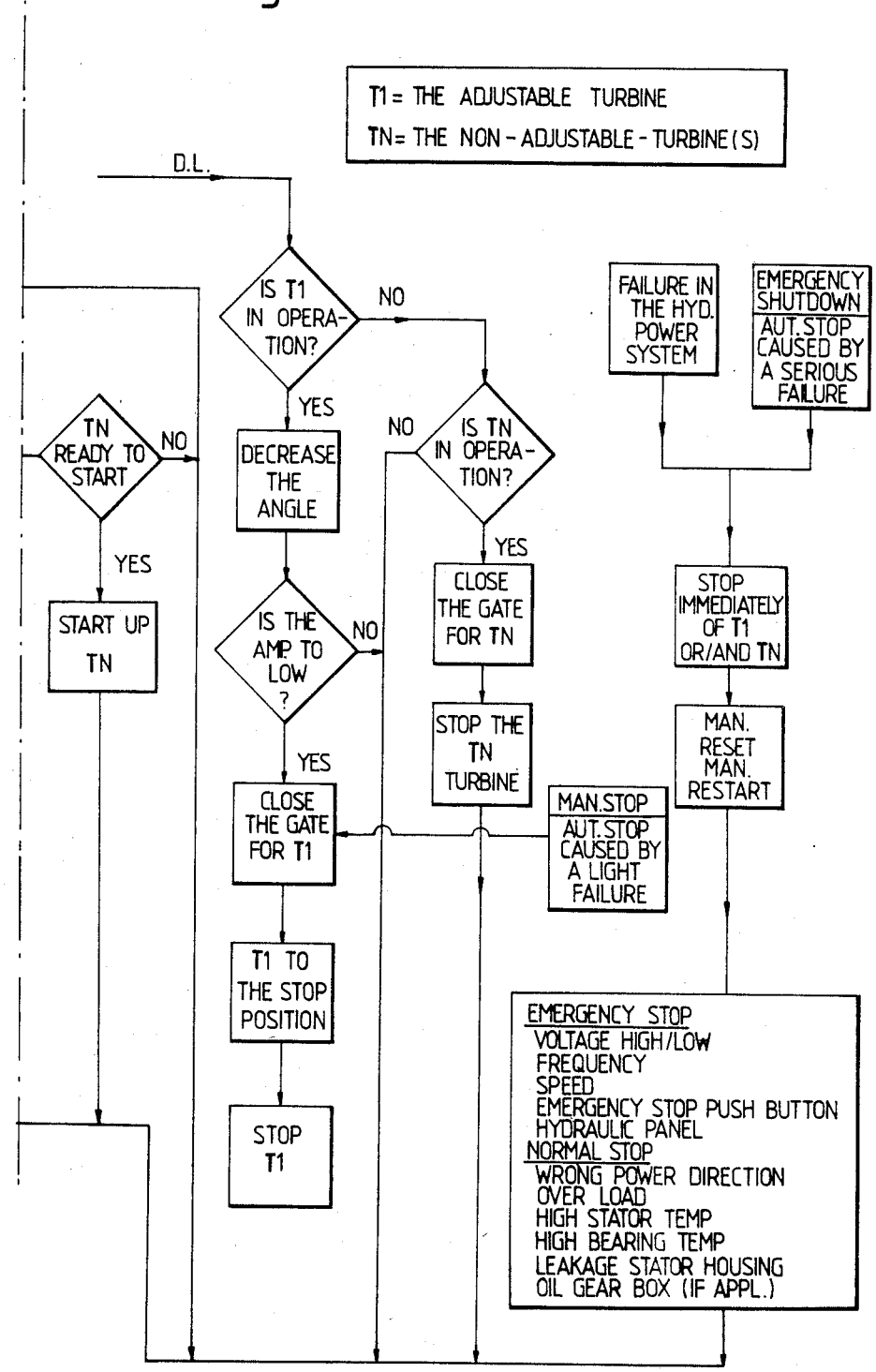

METHOD AND APPARATUS FOR MONITORING HYDRO TURBINE PLANTS

BACKGROUND OF THE INVENTION

This invention concerns a monitoring system for hydro turbines and more specifically a system for start and stop of such turbines and adjustment of the vane angles in one or several turbines.

The hydro turbine comprises a rotating hub provided with a number of vanes and arranged in a tube or the like for flowing water. The rotary energy obtained is transmitted to a generator for producing electric current.

The rotary energy generated is of course entirely dependent on the amount of flowing water as well as its potential energy, i.e. pressure head. The water amount may vay considerably which means that the turbine will operate with different volume flows at different times. As the turbine is designed to have a maximum efficiency at a certain flow and a certain pressure head, the energy of the water will be utilized to a greater or lesser extent.

By designing the vanes to be adjustable, which means that the vane angle with relation to the water flow may be varied, there is a possibility of optimizing the efficiency within a relatively wide range of water amounts.

An additional way to effectively utilize the water in a current is to minimize the amount of water which passes the turbine or turbines without actuating them. One solution is to arrange a number of small turbines in the plant letting many or few of them operate in dependence on the available amount of water.

SUMMARY OF THE INVENTION

In order to further refine the methods mentioned above, the invention provides for a monitoring and control system for one or several turbines where at least one turbine has adjustable vanes.

BRIEF DESCRIPTION OF THE DRAWING

The invention is described more closely below with reference to the enclosed drawings in which:

FIG. 1a is a diagrammatic representation of an exemplary groove structure depicting the various sensing levels.

FIG. 1b is a diagrammatic representation of a generator turbine system according to this invention.

FIG. 2b-2c represent left and right halves of a program for the monitoring system.

DETAILED DESCRIPTION OF THE PREFERRED EMBODIMENT

Figure 2A:
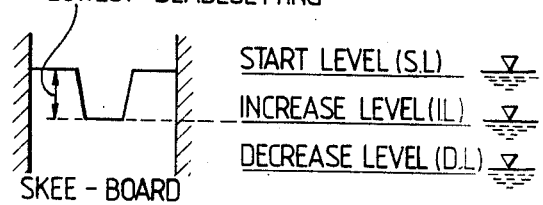
FIG. 2a is a diagrammatic representation of control levels employed in this invention.

In FIG. 1b of the drawings Tl and Tn are turbines having adjustable and non-adjustable vanes respectively. Gl and Gn stand for corresponding electric generators. As shown in FIG. 1a, a groove S is located in the upper part of the water dam where the different levels such as mean start level, increase vane angle level and decrease van angle/stop level are represented respectively by SL, IL and DL.

According to the invention, the potential energy is best utilized if the water level is maximum above the turbines. This means that the amount of water passing the turbine must be the same as the amount of water flowing into the dam. In order to control this, level indication means are arranged in a control section, (having the form of a groove S), in the dam, which means measure the level at predetermined intervals. At a certain level SL, the turbine Tl is signalled to start. This turbine is provided with adjustable vanes which at the start moment are adjusted for a minimum water flow. If, at a later moment, the water has reached or remains at level IL, a signal is given to increase the vane angles in turbine Tl which means that more water is let through and a stronger effect is obtained. If the water level continues to rise or remain at IL, the vane angles are increased to their maximum value, the maximum effect with regard to the available water amount being obtained. If then, the water level continues to rise or remains at IL or above, a signal is given to start turbine TN and so on.

If, on the other hand, the level in the control section drops to a position DL, the angles of the vanes in Tl are decreased until a stable position has been reached and, if necessary, down to almost zero when the turbine is stopped. In a corresponding way the remaining non-adjustable turbines are stopped. These, however, only have two positions, maximum or zero.

According to the invention, the level in the water dam varies and the generator capacity is adapted thereto. In this way the had is utilized to the optimum and only small amounts of water will pass without being used. In practice some tolerances are built into the system in order to restrict the numbers of starts and stops. In addition Tl is adapted not to work when the amounts of water are too small which is a detriment to efficiency. The minimum amount of water allowed corresponds with the level difference SL-IL in the groove S. If the amount of water flowing into the dam is very small, TL will operate interruptedly, the water level being varied between two values SL and DL respectively. The difference between these values should not exceed 10 cm.

The system described above provides for one or several turbines, at least one of them having adjustable vanes. In addition, all signal processing takes place in a stationary installation above the water and separated from the turbine units which preferably are built together with respective generators as submersible units.

After the system has been started, preferably manually, by Tl being started when the water level in the tank is high enough for start, SL, the plant is self controlled. When the turbine Tl is stopped, the vane angles automatically take positions with a minimum angle, which mans that the turbine is almost closed. Thus every start begins with minimum angles.

Figure 2B:
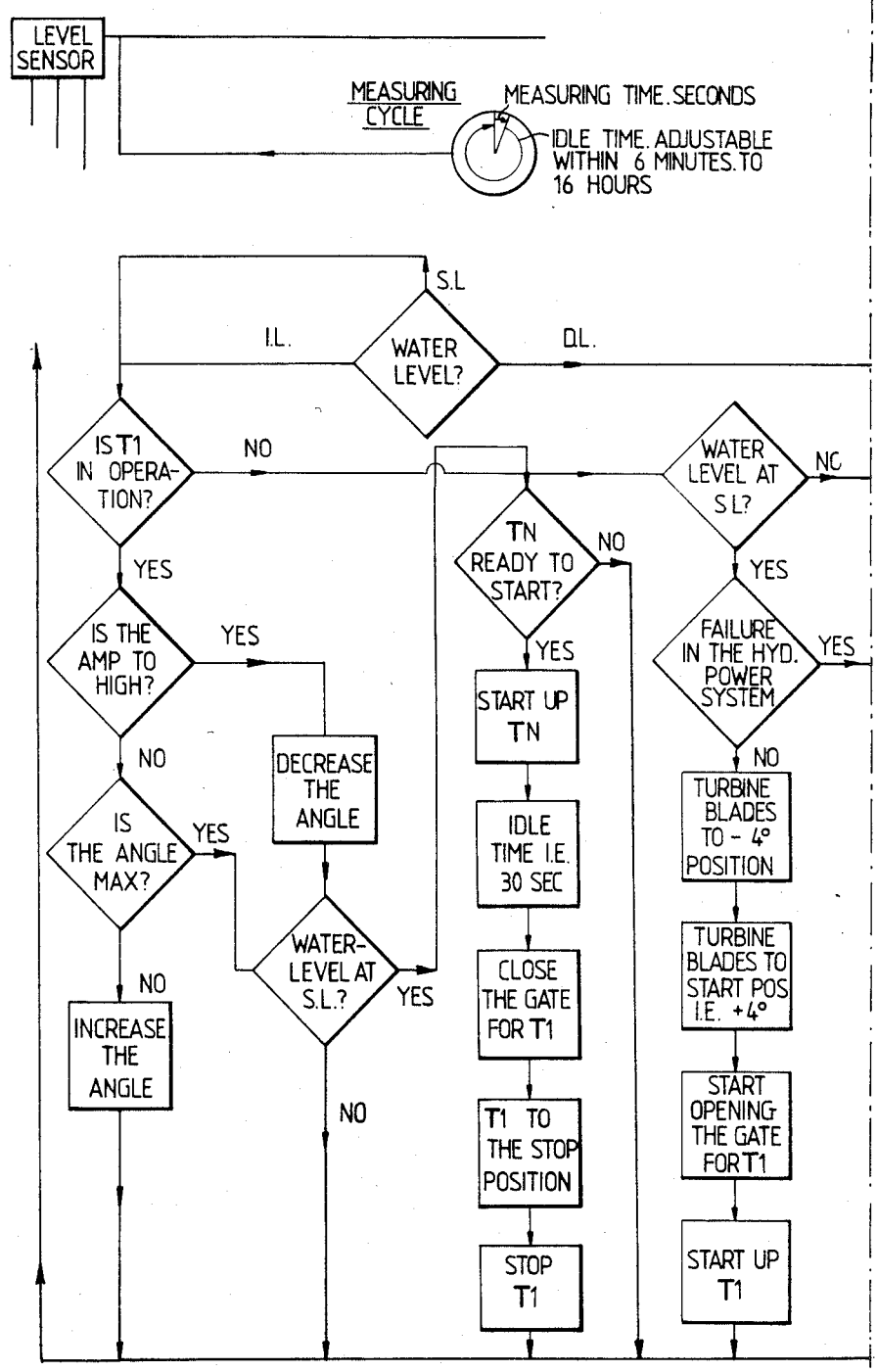

FIGS. 2b and 2c show left and right halves of an typical program which illustrates in detail a typical monitoring system. However, different programs are included within the scope of the invention.

Figure 3:
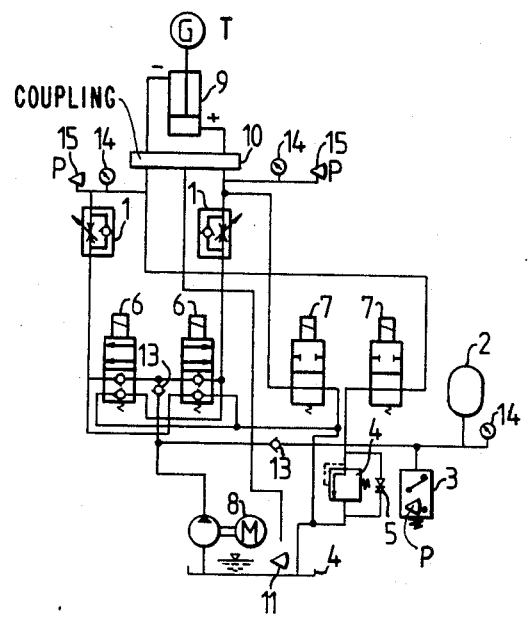
FIG. 3 is a detailed block diagram of a hydraulic control system according to this invention.

Referring now to FIG. 3, an exemplary hydraulic system is described. During normal duty, the pressure governor 3 is measuring the pressure in the accumulator 2 and operates the hydraulic pump 8 if and when it is necessary. The magnetic valves 7 when selectively energized stop oil from flowing to the cylinder 9. In case of shut down, i.e., power failure or low oil level in the oil tank 12, (level switch 11) the valves 7 open and the accumulated oil in the accumulator 2 goes to the cylinder 9 which closes the blades. At normal operation, the pumps and one of the magnetic valves 6 are activated at the same time pumping oil to the cylinder 9 via the non-return valves 1, where the oil flow also can be adjusted. On its way to the cylinder which is arranged in the propeller hub the oil has to pass a rotating coupling 10. When the cylinder 9 reaches its end position, it is sensed by one of the pressure governors 15. The sensors 15 are set below the setting of adjustable pressure limit valve 4 which also operates as an emergency valve. The pressure governors 15 are connected via an electric contact to the process controller for further actions.

In regard to the above, it is noted that magnetic valves 6 and 7 are illustrated in such a manner that magnetic valves 6 are shown in the condition of normal operation while magnetic valves 7 are shown in a condition of operation at shutdown. Therefore, pressure governor 3 measures the pressure in accumulator 2 and operates the hydraulic pump 8 as necessary. Under normal conditions of operation, the magnetic valves 6 are activated so that oil from reservoir 12 is pumped through valve 6 and through the throttled adjustable non-return valves 1 to the coupling 10.

The magnetic valve 7, when selectively energized stops oil from flowing to the cylinder 9 in that such oil, as applied to the coupling by valves 6 and 1, may be returned to the reservoir 12 as a function of the energized condition of the magnetic valves 7.

Under shutdown conditions, such as may occur during power failure or a low oil level in tank 12, the valves 7 open and the accumulated oil in the accumulator 2 goes to the cylinders 9 to close the turbine blades. Under shutdown conditions, as thus specified when the magnetic valves 7 are open, a path from the accumulator 2 through the valves 6 and 1 to the coupling 10 is clearly indicated in FIG. 3. When magnetic valves 7 are open, no drainage from the coupling 10 occurs and hence the oil from the accumulator 2 applied thereto will flow to the cylinder 9. Cylinder 9 controls the blades of the turbine T in the manner indicated in FIG. 3.

Referring to FIG. 2b, it is seen that the program periodically checks the angle of turbine blade, as indicated by the diamond in the extreme left hand column annotated "Is The Angle Max". Similarly in the extreme right column of FIG. 2b positioning of the turbine blade to +or−4° positions, which is an essentially closed condition, is indicated. The full open or fully closed condition of the turbine blade is indicated by the pressure governors 15 (FIG. 3) which act as end position sensors. Hence the open or closed position of the right and left pressure governors for the right and left end positions act as sensors to enable to program for the controller shown in FIGS. 2b and 2c to ascertain whether or not the turbine blades present on T1 are in either of their extreme end positions as required for use in the program.

While I have described above the principles of my invention in connection with specific apparatus, it is to be clearly understood that this description is made only by way of example and not as a limitation to the scope of my invention as set forth in the objects thereof and in the accompanying claims.

What a claim is:

1. An apparatus for monitoring and controlling the operation of hydro turbines adjacent a water dam comprising:

a groove in said water dam having a predetermined cross-sectional area on the same level as the nominal level of the dam;

level indicating means arranged in said groove to detect the water level in the dam at predetermined intervals and to generate signals in response to the detected levels, said signals generated indicating the presence of at least first, second and third preselected water levels in the dam;

operating means for controlling the start and stop of the turbines and being controlled by said generated signals, said operating means responsive to generated signals representative of said first preselected level enabling one of said turbines to be started with the vane angles thereof set to a minimum condition;

means responsive to said generated signals for adjusting the vane angles of said one of said turbines, said means responsive acting in response to generated signals representative of a water level equal to or exceeding said second level to increase said vane angles of said one of said turbines after the same has been started, said means responsive further acting in response to continued generated signals representative of a water level remaining equal to or exceeding said second level to further increase said vane angles of said one of said turbines to a maximum value with respect to available water, and said means responsive acting to decrease said vane angles in response to generated signals representing said third water level.

2. The apparatus according to claim 1 wherein said groove has a cross-sectional area of such a dimension that the water amount flowing through said groove corresponds with the minimum amount of water necessary to operate the turbine with a minimum efficiency.

3. The apparatus according to claim 1 wherein said operating means acts after said vane angles of said one of said turbines have been increased to said maximum value and in response to generated signals indicating said water level remains equal to or exceeds said second level to start another of said hydro turbines.

4. The apparatus according to claim 1 wherein said operating means acts to shut down said one of said turbines upon said means responsive decreasing said vane angles to said minimum condition in response to generated signals representing said third water level.

5. The apparatus according to claim 4 wherein said operating means acts after said one of said turbines is shut down and in response to generated signals indicating said water level remains equal to or less than said third water level to shut down another of said hydro turbines if the same has been started.

6. A method for monitoring and controlling the operation of at least one hydro turbine including an adjustment of vane angles in said at least one hydro turbine for maximum utilization of available water comprising the steps of:

sensing the level of water in a dam to determine the presence of at least first, second and third levels;

generating signals in response to the level of water sensed; and controlling the operation of said at least one hydro turbine and adjusting the vane angles of said at least one hydro turbine in response to said signals generated, said step of controlling including enabling said at least one hydro turbine to be started during the presence of said first level with the vane angles thereof set to a minimum condition, said first level representing a mean start level, increasing said vane angles in response to the level of water sensed reaching or exceeding said second level, increasing said vane angles to a maximum value with respect to available water in response to the level of water sensed remaining at or exceeding said second level, and decreasing said vane angles in response to said level of water sensed decreasing to said third level.

* * * * *